(12) United States Patent
Sun et al.

(10) Patent No.: US 6,986,581 B2
(45) Date of Patent: Jan. 17, 2006

(54) LIGHT EMITTING MATERIAL INTEGRATED INTO A SUBSTANTIALLY TRANSPARENT SUBSTRATE

(75) Inventors: Xiao-Dong Sun, Fremont, CA (US); Jian-Qiang Liu, Campbell, CA (US)

(73) Assignee: Superimaging, Inc., Fremont, CA (US)

( * ) Notice: Subject to any disclaimer, the term of this patent is extended or adjusted under 35 U.S.C. 154(b) by 0 days.

(21) Appl. No.: 10/979,131

(22) Filed: Nov. 3, 2004

(65) Prior Publication Data

US 2005/0094109 A1    May 5, 2005

Related U.S. Application Data

(60) Provisional application No. 60/516,939, filed on Nov. 3, 2003.

(51) Int. Cl.
*G03B 21/56*    (2006.01)
(52) U.S. Cl. .............................. 353/31; 353/79; 359/452
(58) Field of Classification Search ................. 353/31, 353/79, 84; 359/443, 452, 460
See application file for complete search history.

(56) References Cited

U.S. PATENT DOCUMENTS

| | | | |
|---|---|---|---|
| 3,598,995 A | | 8/1971 | Inoue et al. |
| 3,881,800 A | * | 5/1975 | Friesem ............ 359/25 |
| 3,953,117 A | | 4/1976 | Cannon |
| 4,158,210 A | | 6/1979 | Watanabe et al. |
| 4,689,522 A | | 8/1987 | Robertson |
| 4,814,666 A | * | 3/1989 | Iwasaki et al. ............ 313/468 |
| 4,960,314 A | | 10/1990 | Smith et al. |
| 4,989,956 A | | 2/1991 | Wu et al. |
| 5,142,387 A | | 8/1992 | Shikama et al. |
| 5,162,160 A | * | 11/1992 | Matsui et al. ............ 428/690 |
| 5,233,197 A | | 8/1993 | Bowman et al. |
| 5,289,315 A | | 2/1994 | Makita et al. |
| 5,347,644 A | | 9/1994 | Sedlmayr |
| 5,424,535 A | | 6/1995 | Albion et al. |
| 5,473,396 A | | 12/1995 | Okajima et al. |
| 5,566,025 A | | 10/1996 | Knoll et al. |
| 5,646,479 A | | 7/1997 | Troxell |
| 5,684,621 A | | 11/1997 | Downing |
| 5,764,403 A | | 6/1998 | Downing |
| 5,784,162 A | | 7/1998 | Cabib et al. |
| 5,786,582 A | | 7/1998 | Roustaei et al. |

(Continued)

FOREIGN PATENT DOCUMENTS

JP    4281422    10/1992

OTHER PUBLICATIONS

"A Three-Color, Solid-State, Three Dimensional Display", E. Downing et al. Science vol. 273, pp 1185-89, 1996.

(Continued)

*Primary Examiner*—William C. Dowling
(74) *Attorney, Agent, or Firm*—Daniel H. Sherr (57) ABSTRACT

In accordance with embodiments, viewable images can be created in glass. Viewable images may be created in glass by using a projector which projects ultraviolet light to excite light emitting material. Clear images may be created in glass because the size the light emitting particles in the glass is less than 400 nanometers. In embodiments, the visible illumination of a transparent substrate to display an image is possible, while the transparent substrate remains transparent. Accordingly, for example, drivers of automobiles may view images (e.g. map images) on their windshield while they are driving. As another example, window shoppers may view enhanced advertisements in the windows of stores that they are approaching.

64 Claims, 8 Drawing Sheets

U.S. PATENT DOCUMENTS

| | | | |
|---|---|---|---|
| 5,914,807 A | 6/1999 | Downing | |
| 5,921,650 A | 7/1999 | Doany et al. | |
| 5,943,160 A | 8/1999 | Downing | |
| 5,956,172 A * | 9/1999 | Downing | 359/326 |
| 5,957,560 A * | 9/1999 | Do et al. | 353/88 |
| 6,166,852 A | 12/2000 | Miro | |
| 6,221,112 B1 | 4/2001 | Snider | |
| 6,261,402 B1 | 7/2001 | Watanabe et al. | |
| 6,327,074 B1 * | 12/2001 | Bass et al. | 359/326 |
| 6,337,769 B1 | 1/2002 | Lee | |
| 6,439,888 B1 | 8/2002 | Boutoussov et al. | |
| 6,501,590 B2 * | 12/2002 | Bass et al. | 359/326 |
| 6,507,436 B2 | 1/2003 | Nishikawa et al. | |
| 6,654,161 B2 | 11/2003 | Bass et al. | |
| 6,769,773 B1 | 8/2004 | Wu | |
| 6,809,781 B2 | 10/2004 | Setlur et al. | |
| 6,870,671 B2 * | 3/2005 | Travis | 359/443 |
| 2001/0005282 A1 | 6/2001 | Etori et al. | |
| 2002/0024495 A1 | 2/2002 | Lippert et al. | |
| 2002/0048058 A1 | 4/2002 | Nishikawa et al. | |
| 2002/0088925 A1 | 7/2002 | Nestorovic et al. | |
| 2002/0120916 A1 | 8/2002 | Snider, Jr. | |
| 2002/0140338 A1 | 10/2002 | Sluzky | |
| 2002/0190224 A1 | 12/2002 | Tazaki | |
| 2003/0198456 A1 | 10/2003 | Steiner et al. | |
| 2003/0213967 A1 | 11/2003 | Forrest et al. | |
| 2003/0214724 A1 | 11/2003 | Fujikawa et al. | |
| 2003/0227004 A1 | 12/2003 | Dopps | |
| 2004/0022071 A1 | 2/2004 | Cheng et al. | |
| 2004/0041988 A1 | 3/2004 | Kitamura | |
| 2004/0070551 A1 | 4/2004 | Walck et al. | |
| 2004/0090794 A1 | 5/2004 | Ollett et al. | |
| 2004/0100692 A1 * | 5/2004 | Hou | 359/452 |
| 2004/0114219 A1 | 6/2004 | Richardson | |
| 2004/0135976 A1 | 7/2004 | Ishihara et al. | |
| 2004/0149998 A1 | 8/2004 | Henson et al. | |
| 2004/0164669 A1 | 8/2004 | Kawaguchi et al. | |
| 2005/0030617 A1 * | 2/2005 | Umeya | 359/443 |
| 2005/0088737 A1 * | 4/2005 | Piehl | 359/443 |

OTHER PUBLICATIONS

J. Lewis et al., IEEE Trans Election Devices vol. 18 pp. 724, 1971.

Murray, "Head-up displays get second glance", EE Times, Jan. 5, 2004.

E-Window Product Web Page. www.nano-proprietary.com.

Rockwell Collins Product Web Page. www.rockwellcollins.com.

Steigerwald et al., "Illumination With Solid State Lighting Technology", IEEE Journal on Selected Topics in Quantum Electronics, Mar. 2002, vol. 8, No. 2.

Jeon et al. "A novel famrication method for a 64×64 matrix-addressable GaN-based micro-LED array", Phys. Stat. Sol. (a) 200, No. 1, pp79-82 (2003).

Hawkyard, "The release of disperse dyes during thermal processing" Journal of the society of dyes and colourists, vol. 97 (1981) 213-219.

ProScreenInc Product Web Page. www.proscreeninc.com.

Web Page from www.smartmotorist.com.

Iwaya, et al., "High Power UV-Light-Emitting Diode on Sapphire", Jpn. J. Appl. Phys. vol. 42(2003) pp. 400-403.

Coosemans et al., "MT-compatible . . . datalinks", Materials Science In Semiconductor Processing, vol. 3 (2000) pp 475-480.

"Handbook of Plastics, Elastomers, and Composites" Harper, C. McGraw-Hill, 3rd Ed (1996).

Xiao-Dong (Ted) Sun, etc. Identification and optimization of advanced phosphors using combinatorial libraries Appl. Phys. Lett., vol. 70, No. 25, Jun. 23, 1997.

* cited by examiner

LIGHT EMITTING MATERIAL INTEGRATED INTO A SUBSTANTIALLY TRANSPARENT SUBSTRATE

Priority is claimed to U.S. Provisional Patent Application No. 60/516,939, filed in the U.S. Patent and Trademark Office on Nov. 3, 2003.

BACKGROUND

The reproduction of images has had a positive effect on many people's lives. One of the earliest technologies for reproducing images was the movie projector, which allowed for audiences to view theatrical productions without live actors and actresses. Televisions were invented, which allowed people to watch moving pictures in the comfort of their own homes. The first televisions were cathode ray tube (CRT) televisions, which is a technology that is still being used today. During the computer age, it has been desirable to reproduce images which are output from computers through monitors. Like many televisions, many computer monitors use CRT technology.

Other technologies have been developed as substitutes for CRT technology. For example, liquid crystal display (LCD) technology is commonplace for both computer monitors and televisions. A LCD is a relatively thin display, which is convenient for many people. Other examples of displays are plasma displays, rear projections displays, and projectors. As display technology has improved, many new applications are being developed. For example, many attempts have been made to develop displays which create viewable images in glass. However, there have been many technical challenges that have prevented creation of viewable images in glass or other transparent material. Specifically, it has been difficult for glass to be maintained in a substantially transparent state and be able to display viewable images with sufficient illumination and clarity.

SUMMARY

In accordance with embodiments, viewable images can be created in glass. Viewable images may be created in glass by using a projector which projects ultraviolet light to excite light emitting material. Clear images may be created in glass because the size the light emitting particles in the glass is less than 400 nanometers. In embodiments, the visible illumination of a transparent substrate to display an image is possible, while the transparent substrate remains transparent. Accordingly, for example, drivers of automobiles may view images (e.g. map images) on their windshield while they are driving. As another example, window shoppers may view enhanced advertisements in the windows of stores that they are approaching, while the windows remain transparent.

Embodiments relate to an apparatus including light emitting material. The light emitting material is integrated into a substantially transparent substrate (e.g. glass or tinted glass). The light emitting material emits visible light in response to absorption of ultraviolet light from a projector.

Embodiments relate to an apparatus including light emitting material integrated into a substantially transparent substrate (e.g. glass or tinted glass). The light emitting material is configured to emit visible light in response to absorption of ultraviolet light. The light emitting material includes a plurality of light emitting particles. Each of the light emitting particles has a diameter less than 400 nanometers.

Embodiments relate to an apparatus which includes a substantially transparent substrate (e.g. glass or tinted glass). The apparatus also includes a means for selectively generating visible illumination of the transparent substrate to display an image in the transparent substrate, while the transparent substrate remains transparent.

DESCRIPTION

Figure 1:
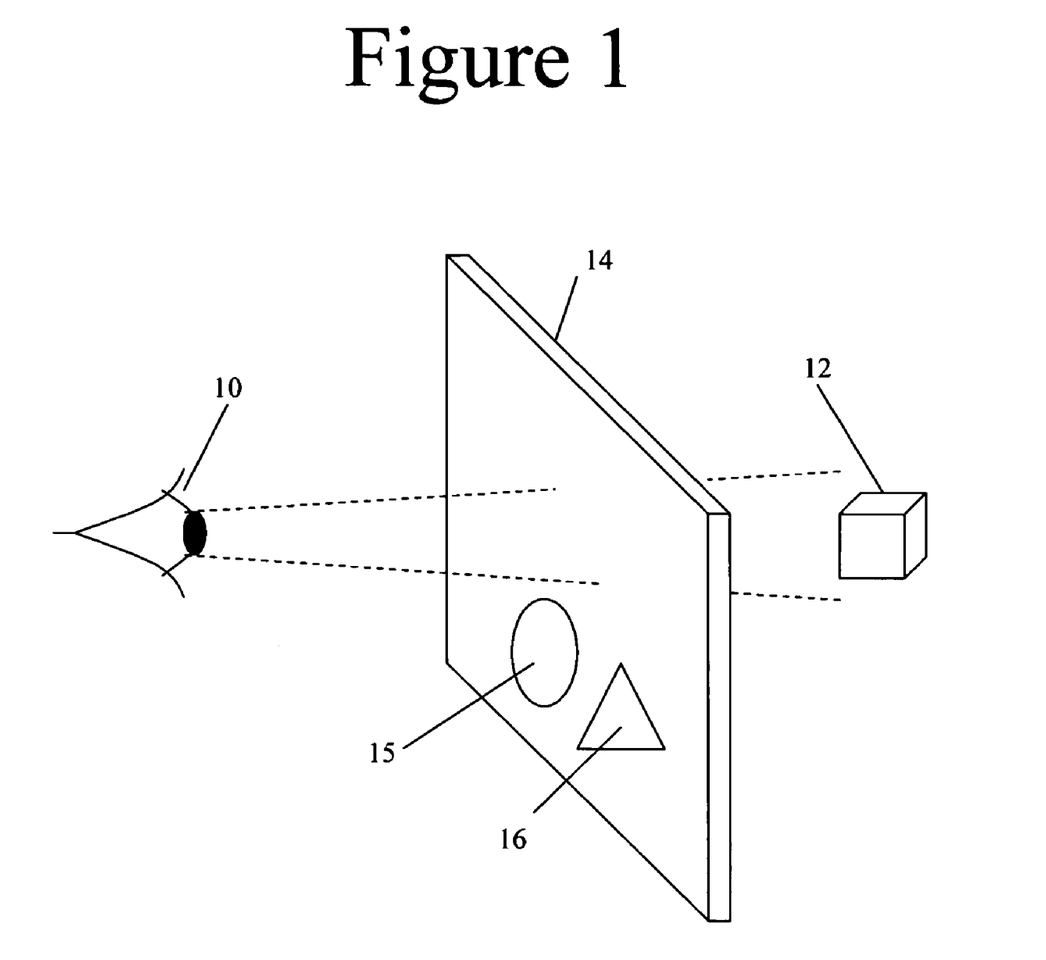
FIG. 1 is an example diagram of a substantially transparent display.

FIG. 1 is an example diagram of a substantially transparent display, in accordance with embodiments. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a building window, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

Figure 2:
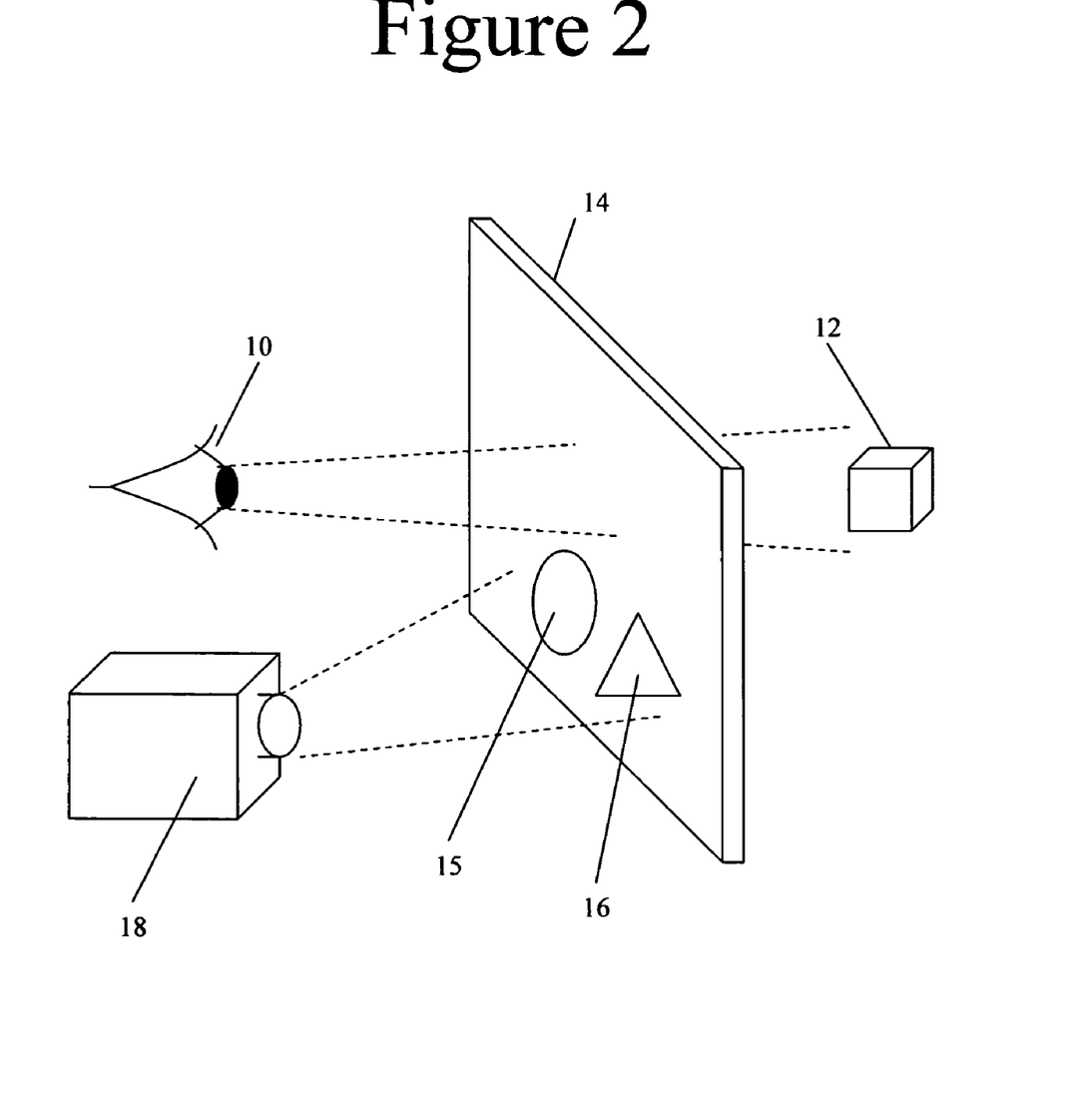
FIG. 2 is an example diagram of a transparent display illuminated with excitation light from a projector.
Figure 3:
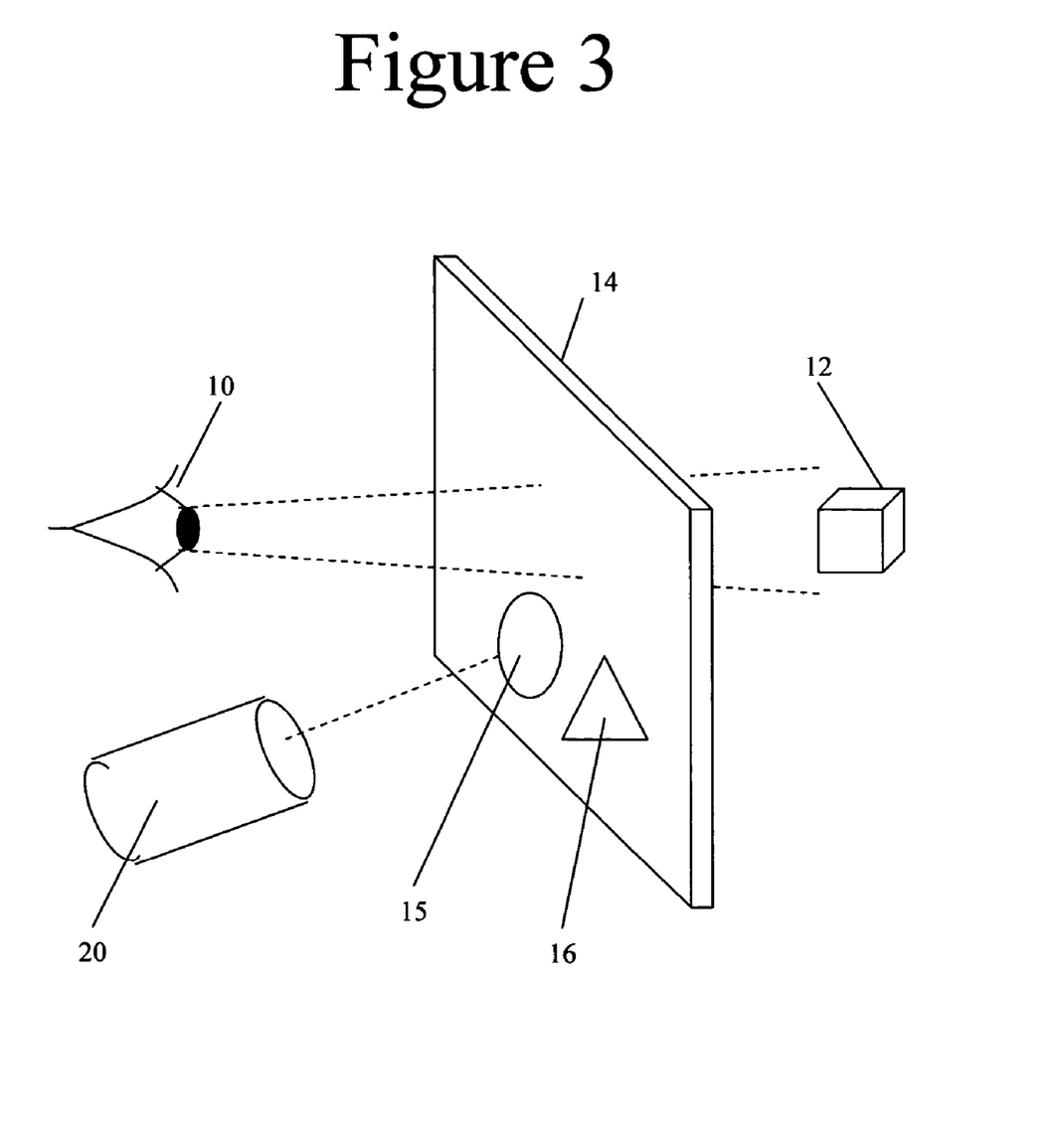
FIG. 3 is an example diagram of a transparent display illuminated with excitation light from a laser.

FIGS. 2 and 3 are example diagrams of transparent displays illuminated with excitation light (e.g. ultraviolet light or infrared light) from light sources (e.g. projector 18 or laser 20), in accordance with embodiments. Substrate 14 may receive excitation light from a light source (e.g. projector 18 or laser 20). The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

The excitation light may be ultraviolet light, in accordance with embodiments of the present invention. If the excitation light is ultraviolet light, then when the light emitting material emits visible light in response to the ultraviolet light, a down-conversion physical phenomenon occurs. Specifically, ultraviolet light has a shorter wavelength and higher energy than visible light. Accordingly, when the light emitting material absorbs the ultraviolet light and emits lower energy visible light, the ultraviolet light is down-converted to visible light because the ultraviolet light's energy level goes down when it is converted into visible light. In embodiments, the light emitting material is fluorescent material.

The excitation light may be infrared light, in accordance with embodiments of the present invention. If the excitation light is infrared light, then when the light emitting material emits visible light in response to the infrared light, an up-conversion physical phenomenon occurs. Specifically, infrared light has a longer wavelength and lower energy than visible light. Accordingly, when the light emitting material absorbs the infrared light and emits higher energy visible light, the infrared light is up-converted to visible light because the infrared light's energy level goes up when it is converted into visible light. In embodiments, the light emitting material is fluorescent material. In the up-conversion physical phenomenon, absorption of more than one infrared light photon may be necessary for the emission of every visible light photon.

In embodiments illustrated in FIG. 2, the excitation light is output by projector 18. Projector 18 may be a digital projector. In embodiments, projector 18 is a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. In other embodiments, the projector 18 is a liquid crystal display (LCD) projector. In embodiments, the projector may be a liquid crystal on silicon (LCOS) projector. In embodiments, the projector may be an analog projector (e.g. a slide film projector or a movie film projector). One of ordinary skill in the art would appreciate other types of projectors which may be used to project ultraviolet light on substrate 14.

In embodiments illustrated in FIG. 3, excitation light is output from laser 20. The intensity and/or movement of a laser beam output from laser 20 may be modulated to create an image in substrate 14. In down-conversion embodiments, the output from laser 20 may be ultraviolet light. In up-conversion embodiments, the output from laser 20 may be infrared light.

Figure 4:
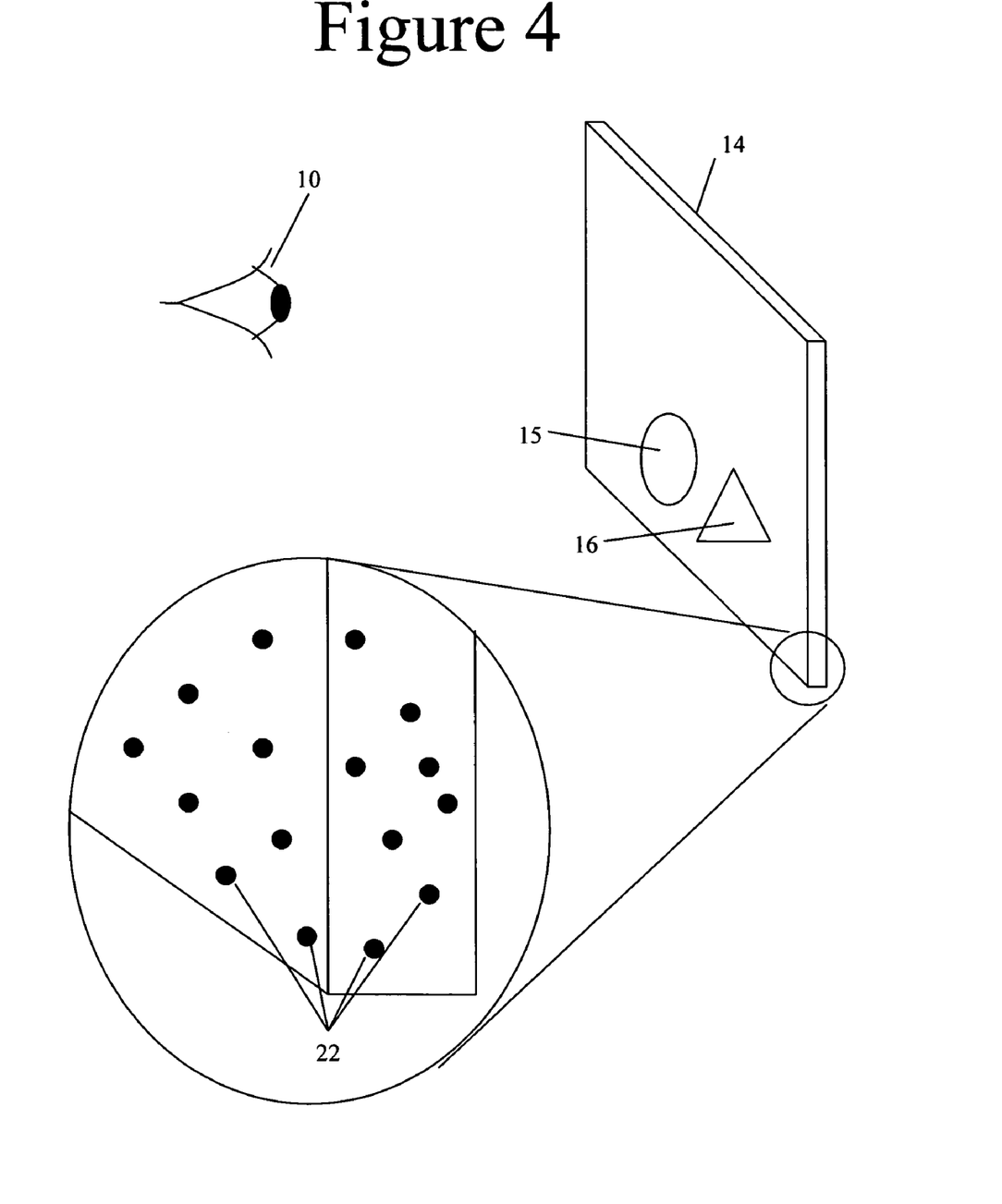
FIG. 4 is an example diagram of light emitting particles dispersed in a substantially transparent substrate.
Figure 5:
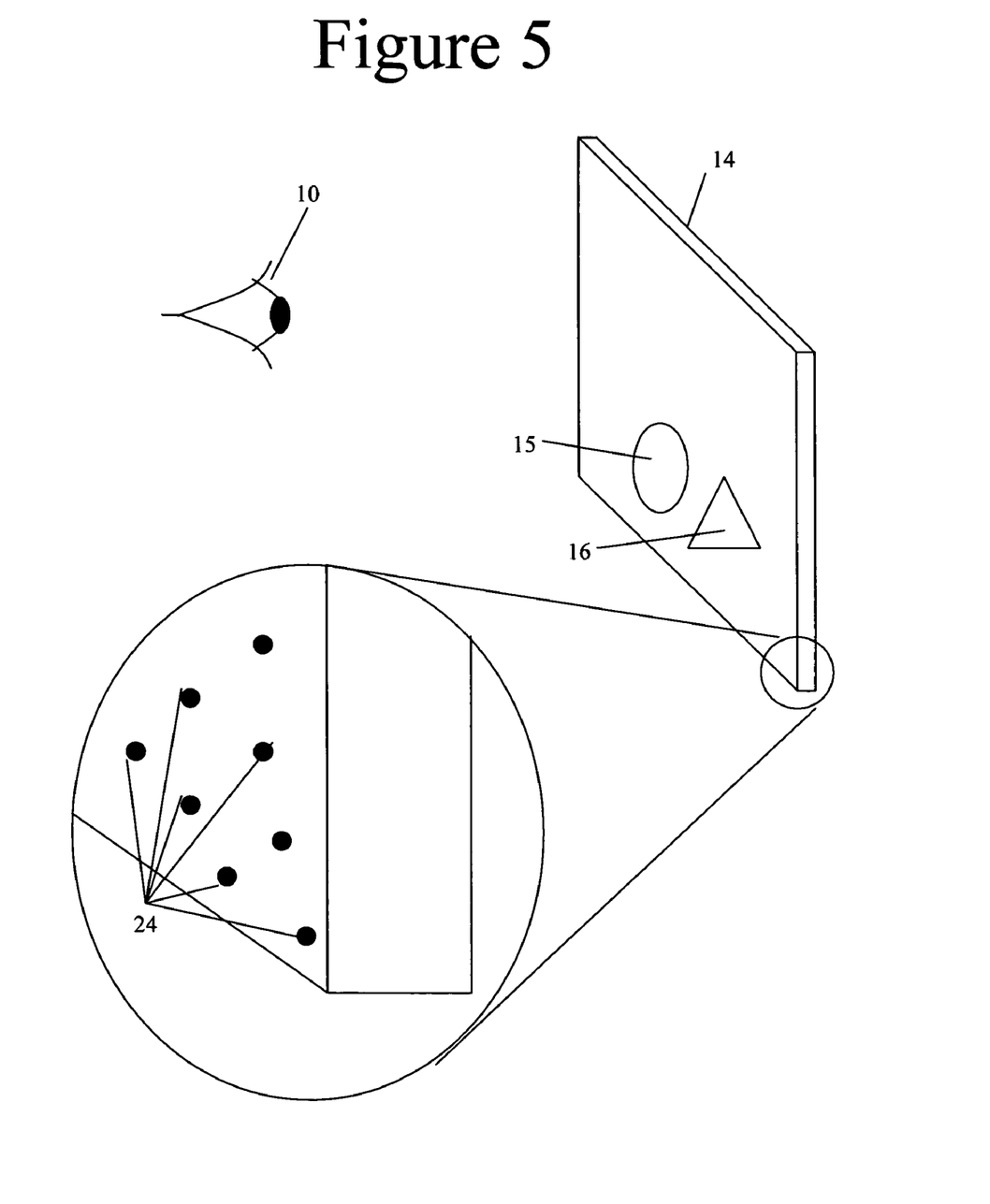
FIG. 5 is an example diagram of light emitting particles disposed on a surface of a substantially transparent substrate.

FIG. 4 is an example diagram of light emitting material (e.g. light emitting particles 22) dispersed in a substantially transparent substrate, according to embodiments. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles. FIG. 5 is an example diagram of light emitting particles 24 disposed on a surface of substrate 14. Light emitting particles 24 may be integrated into substrate 14 by being coated on substrate 14.

Light emitting material (e.g. light emitting particles 22 and light emitting particles 24) may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. According to embodiments, each of the light emitting particles has a diameter that is less than about 400 nanometers. According to embodiments, each of the light emitting particles has a diameter that is less than about 300 nanometer. According to embodiments, each of the light emitting particles has a diameter that is less than about 200 nanometers. According to embodiments, each of the light emitting particles has a diameter that is less than about 100 nanometers. The light emitting particles may be individual molecules.

Different types of light emitting particles (e.g. light emitting particles 22 and light emitting particles 24) may be used together that have different physical characteristics. For example, in order to create color images in substrate 14, different types of light emitting particles may be utilized that are associated with different colors. For example, a first type of light emitting particles may be associated with the color red, a second type of light emitting particles may be associated with the color green, and a third type of light emitting particles may be associated with the color blue. Although the example first type, second type, and third type of light emitting particles are primary colors, one of ordinary skill in the art would appreciate other combinations of colors (e.g. types of colors and number of colors) in order to facilitate a color display.

In down-conversion embodiments, light emitting particles which emit red light may include Europium, light emitting particles which emit green light may include Terbium, and light emitting particles which emit blue or yellow light may include Cerium (and/or Thulium). In up-conversion embodiments, light emitting particles which emit red light may include Praseodymium, light emitting particles which emit green light may include Erbium, and light emitting particles which emit blue light may include Thulium. In embodiments, light emitting particles are fluorescent molecules that emit different colors (e.g. red, green, and blue). In embodiments, light emitting particles are included in pure organic or organo-metallic dyes.

Different types of light emitting particles may absorb different ranges of excitation light to emit the different colors. Accordingly, the wavelength range of the excitation light may be modulated in order to control the visible color emitted from the light emitting particles in substrate 14. In embodiments, different types of light emitting particles may be mixed together and integrated into substrate 14. By modulating the wavelength of the excitation light, along with spatial modulation and intensity modulation of the excitation light, visible light with specific color characteristics can be created in substrate 14. For example, by selectively exciting specific combinations of different types of light emitting particles associated with primary colors, virtually any visible color can be emitted from substrate 14.

In DLP projector embodiments, the wavelength of ultraviolet light emitted from a DLP projector can be modulated using a color wheel with specific ultraviolet pass filters. Similar modulation techniques may be utilized in other projector embodiments and laser embodiments. In embodiments, multiple projectors and multiple lasers may be utilized, each being associated with a specific ultraviolet wavelength range to excite a specific type of light emitting particle, to output a specific color of light.

Figure 6:
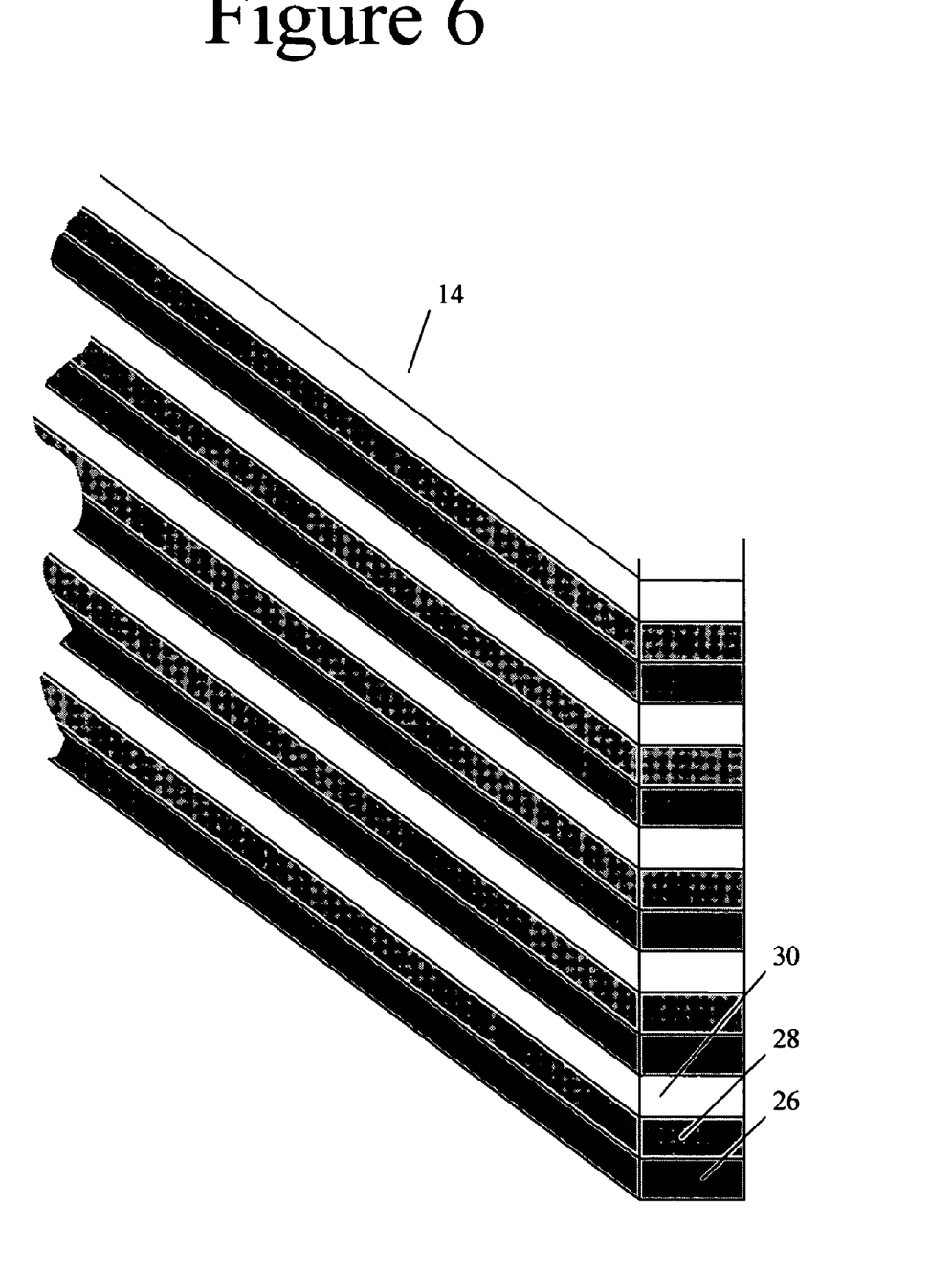
FIG. 6 is an example diagram of different types of light emitting particles, associated with different visible colors, dispersed in different stripe regions in a substantially transparent substrate.

FIG. 6 is an example diagram of different types of light emitting particles, associated with different visible colors, dispersed in different pixel regions (e.g. stripe region 26, stripe region 28, and stripe region 30) in a substantially transparent substrate. In embodiments, substrate 14 may include different regions in which different types of light emitting particle are dispersed. For example, a first type of light emitting particle (e.g. a light emitting particle associated with red light) may be dispersed in stripe region 26, a second type of light emitting particle (e.g. a light emitting particle associated with green light) may be dispersed in stripe region 28, and a third type of light emitting particle (e.g. a light emitting particle associated with blue light) may be dispersed in stripe region 30. Stripe region 26, stripe region 28, and stripe region 30 may be formed in stripes (i.e. rows).

A projector or laser (e.g. projector 18 or laser 20) may use an excitation light wavelength range that excites all of the different types of light emitting particles and selectively illuminates different colors by spatial modulation of the excitation light. For example, in example FIG. 6, to emit green visible light in a given region of substrate 14, projector 18 or laser 20 may illuminate a portion of stripe region 28 (e.g. which includes light emitting particles associated with green light). In embodiments that spatially separate the different types of light emitting particles, it is not necessary for the excitation light source to modulate the wavelength of the excitation light to create different colors, because color may be selected by the spatial modulation of the excitation light.

Figure 7:
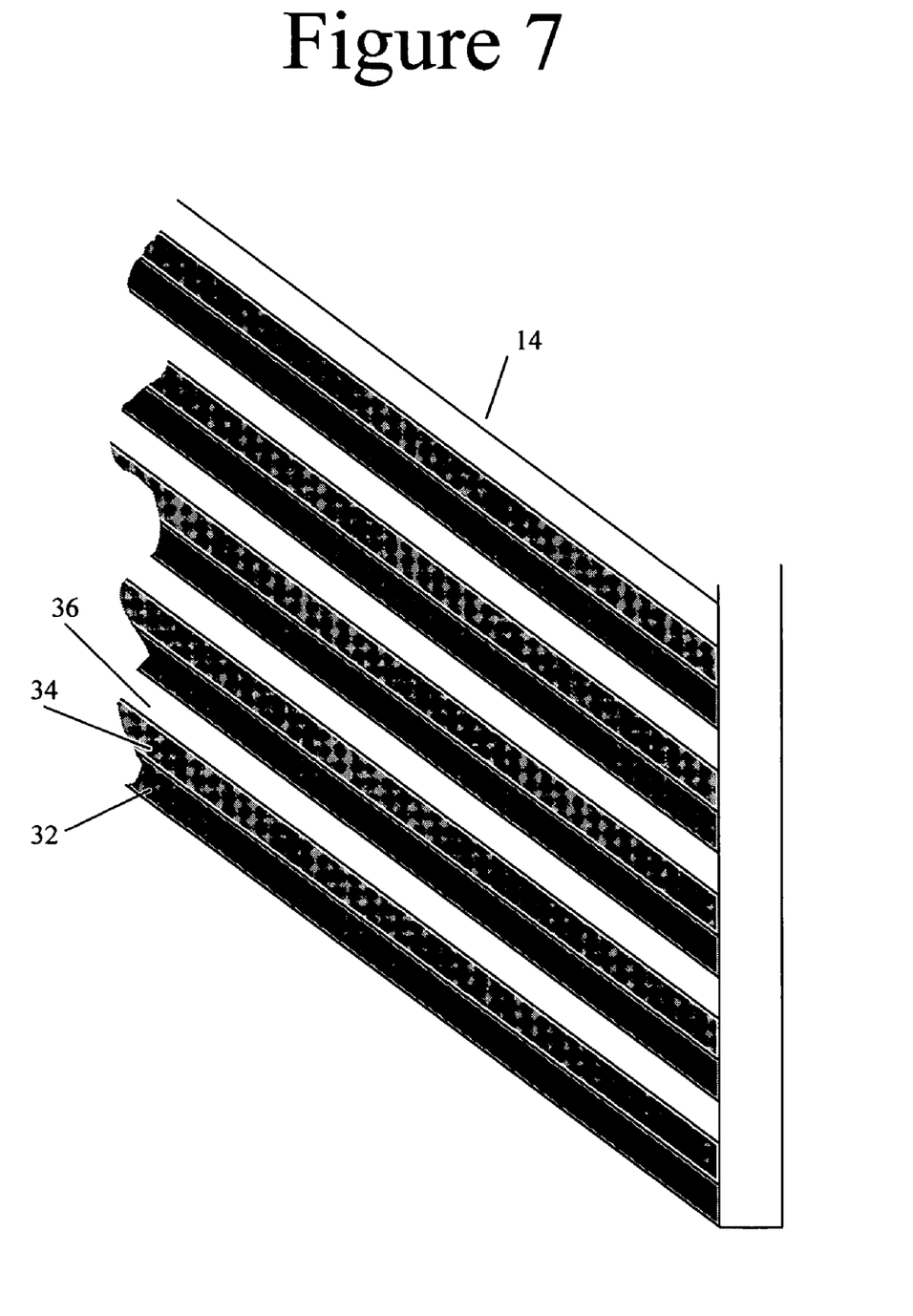
FIG. 7 is an example diagram of different types of light emitting particles, associated with different visible colors, disposed on different stripe regions of a substantially transparent substrate.
Figure 8:
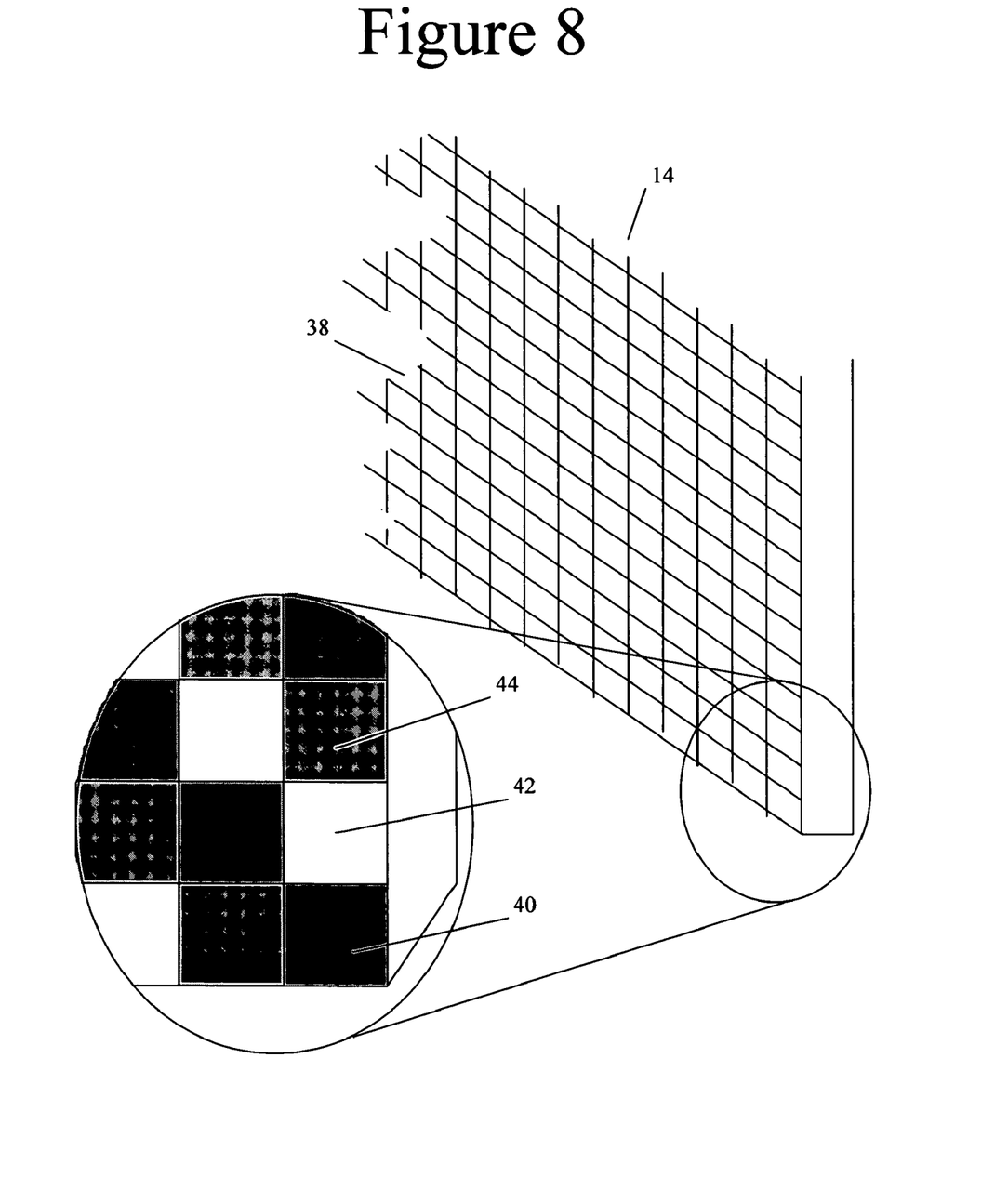
FIG. 8 is an example diagram of different types of light emitting particles, associated with different visible colors, disposed on different matrix regions of a substantially transparent substrate.

Similarly, in embodiments illustrated in FIG. 7, different types of light emitting particles may be coated on regions of substrate 14 (e.g. stripe region 32, stripe region 34, and stripe region 36) instead of being dispersed in substrate 14. In embodiments illustrated in FIG. 8, different types of light emitting particles, associated with different visible colors, are separated into different regions of substrate 14 in the form of a matrix 38. FIG. 8 illustrates different matrix regions (e.g. region 40, region 42, and region 44) that include different types of light excitation particles associated with different colors. One of ordinary skill in the art would appreciate that other pixel configurations are applicable, other than the pixel configurations illustrated in FIGS. 6–8, without departing from embodiments. Although example FIG. 8 illustrates light emitting particles coated on substrate 14, the light emitting particles may also be dispersed in substrate 14, similar to embodiments illustrated in FIG. 6.

Embodiments relate to methods, materials, components, and designs to display optical images or computer information onto an optically transparent screen. An optical projector may be used to project ultraviolet (UV) or lower wavelength visible images or information onto a fluorescent screen, which is in the form of a film, coating, or plate. In embodiments, the screen will down-convert the UV or lower wavelength optical image to a higher wavelength visible fluorescent image, while remaining optically transparent or substantially transparent in an un-projected region.

In embodiments, a UV lamp or lower wavelength visible lamp is used in the projector, which may be a liquid crystal display (LCD) or digital light processor (DLP). The projector may interface to a computer, PDA, DVD, VCR, TV, or other information input devices. In embodiments, a fluorescent screen may be a transparent or translucent glass or plastic plate filled by fluorescent organic dyes or inorganic phosphors. In embodiments, a fluorescent screen may be a transparent or translucent glass or plastic plate coated by fluorescent organic dyes or inorganic phosphors. In embodiments, a fluorescent screen may be a transparent or translucent thin glass sheet or plastic film filled by fluorescent organic dyes or inorganic phosphors. In embodiments, a fluorescent screen may be a transparent or translucent thin glass sheet or plastic film coated by fluorescent organic dyes or inorganic phosphors.

Transparent or substantially transparent displays may have many applications. For example, transparent or substantially transparent displays may display an image on a transparent or translucent window of moving vehicles, such as automobiles, motorcycles, aircrafts, and boats; the image may be information on the conditions of the vehicles. Directions (e.g. GPS map), that are currently displayed on the dashboard electronic display, may be projected onto the windows (e.g. front glass, wind shields) of the vehicle. Drivers do not have to turn their eyes away from the road to view the vehicle conditions and/or directions. Transparent or substantially transparent displays may display images or advertisements on transparent or translucent windows; such transparent window projective display may be applied in any room or building to effectively communicate the information through the window of the structure, while not blocking the view of the window.

In embodiments, to display a full color fluorescence projective display on the transparent screen, full color (e.g. Red, Green, Blue, or RGB) dyes of molecules can be placed onto different pixelized regions of the screen, with each pixel containing RGB elements. In embodiments, three separated modulated UV beams from a projector can be applied to the three sets of RGB elements on the screen. By controlling and partitioning the projective UV lights onto corresponding RGB elements of each pixel on the multiple colored fluorescent screen, a full color image can be displayed on the transparent screen.

In embodiments, a screen is again pixilated using RGB elements. Each pixel comprises 3 portions for RGB respectively. A single projective UV beam can be illuminated onto the pixilated screen. To get various mixtures of RGB for different color, the same UV projective beam on a pixel may be shifted to cover a certain amount of areas of the RGB elements within a pixel. Accordingly, only one projective beam is necessary to generate the full color projective image. The color balance of the RGB for a pixel can be calculated and converted into the right area of RGB elements on the screen, the beam can then be shifted to cover the right relative area percentage of each RGB elements to display the right color on the pixel.

In embodiments, a fluorescent screen may be a transparent or translucent glass or plastic plate filled by fluorescent organic dyes or inorganic phosphors. In embodiments, a fluorescent screen may be a transparent or translucent glass or plastic plate coated by fluorescent organic dyes or inorganic phosphors. In embodiments, a fluorescent screen may be a transparent or translucent thin glass sheet or plastic film filled by fluorescent organic dyes or inorganic phosphors. In embodiments, a fluorescent screen may be a transparent or translucent thin glass sheet or plastic film coated by fluorescent organic dyes or inorganic phosphors.

The glass for the fluorescent screen may include inorganic solids which are transparent or translucent to the visible light. Examples of such inorganic solids are oxides and halides. The glass may include silicates, borosilicate, lead crystal, alumina, silica, fused silica, quartz, glass ceramics, metal fluorides, and other similar materials. These types of glass may be used as the window in rooms, buildings, and/or moving vehicles.

Plastics for fluorescent screens may include organic and polymeric solids, which are transparent or translucent to the visible light. Thermoplastics for fluorescent screens may include special thermoset solids, such as transparent gels. Some examples of the plastics include polyacrylic, polycarbonate, polyethylene, polypropylene, polystyrene, PVC, silicone, and other similar materials.

Glass and plastic may be turned into fluorescent projective displays, by combining them with fluorescent dyes. Fluorescent dyes are organic molecules or materials that can absorb a higher energy photon and emit lower energy photon. To emit visible light, such molecules may absorb UV light or lower wavelength visible (e.g. violet or blue) light, in the typical wavelength range of 190 nm to 590 nm or in the wavelength range of 300 nm to 450 nm. Some examples of the fluorescent dyes include (but are not limited to) commercial dye molecules from various dye vendors, including Lambda Physik and Exciton. Fluorescent dyes that may be used in a transparent display include Pyrromethene, Coumarin, Rhodamine, Fluorescein, and other aromatic hydrocarbons and their derivatives. In addition, there are many polymers containing unsaturated bonds, which can be fluorescent materials that may be used in a transparent display. For example, some of them (MEH-PPV, PPV, etc) have been used in optoelectronic devices, such as polymer light emitting diodes (PLED).

Glass or plastics may be turned into a fluorescent projective display, by combining them with phosphor materials. The down-conversion phosphors include inorganic or ceramic particles or nano-particles, including but not limited to metal oxides, metal halides, metal chalcoginides (e.g. metal sulfides), or their hybrids, such as metal oxo-halides and metal oxo-chalcoginides. These inorganic phosphors have found wide applications in fluorescent lamps and electronic monitors. They may be applied in converting shorter wavelength projective light (e.g. UV and blue) into higher wavelength visible light. They may be dispersed or coated to the transparent screen or window and excited by corresponding shorter wavelength projective light to display a visible image.

Fluorescent phosphors or dye molecules that can be excited into visible light by projective light ranging from ultraviolet light (e.g. wavelength greater than 240 nanometer) to blue (e.g. less than 500 nanometer). Lamps for projectors may emit light in this range of wavelengths. Such lamps are commercially available (e.g. those used for skin-tanning purposes). They can also be halogen lamps, special incandescent lamps, and arc vapor lamps (e.g. mercury, xenon, deuteron, etc). Such lamps may contain phosphors to convert shorter wavelength UV to longer wavelength UV.

Phosphors containing metal oxide hosts (e.g. metal silicates, metal borates, metal phosphates, metal aluminates); metal oxohalides, oxosulfides, metal halides, metal sulfides, and chalcoginides may be applied to the projective fluorescence displays. One example of phosphors that may be used in fluorescent displays includes the Garnet series of phosphors: $(Y_mA_{1-m})_3(Al_nB_{1-n})_5O_{12}$, doped with Ce; where $0 \leq m, n \leq 1$; A includes other rare earth elements, B include B and/or Ga. In addition, phosphors containing common rare earth elements (e.g. Eu, Tb, Ce, Dy, Er, Pr, and/or Tm) and transitional or main group elements (e.g. Mn, Cr, Ti, Ag, Cu, Zn, Bi, Pb, Sn, and/or Tl) as the fluorescent activators may be applied to projective fluorescence displays. Some undoped materials (e.g. metal, Ca, Zn, Cd, tungstates, metal vanadates, and ZnO) are also luminescent materials and may be applied in projective fluorescent displays.

The organic dyes and inorganic phosphors may be filled in or coated on the hosts of glass or plastics to prepare a fluorescent transparent screen. The dye molecules, if dissolved in the hosts, will not scatter the visible light, although it may absorb some visible light and add some color tint to the hosts. In contrast, larger phosphor particles will scatter visible light, which will affect the optical transparency of the hosts. Embodiments relate to different approaches to reduce the scattering of the phosphor particles to visible light. In embodiments, the size of the phosphor particles is reduced. In embodiments, the concentration of phosphor particles is reduced and evenly dispersed in the host. In embodiments, hosts are chosen with refractive indexes close to those of the phosphors to reduce the scattering or phosphors are chosen with refractive indexes close to those of the hosts.

The foregoing embodiments (e.g. light emitting material integrated into a substantially transparent substrate) and advantages are merely examples and are not to be construed as limiting the appended claims. The above teachings can be applied to other apparatuses and methods, as would be appreciated by one of ordinary skill in the art. Many alternatives, modifications, and variations will be apparent to those skilled in the art.

What is claimed is:

1. An apparatus comprising light emitting material integrated into a substantially transparent substrate, wherein the light emitting material is configured to emit visible light in response to absorption of ultraviolet light from a projector, wherein the light emitting material comprises a plurality of light emitting particles, and wherein each of the plurality of light emitting particles has a diameter less than about 400 nanometers.

2. The apparatus of claim 1, wherein the projector is configured to output multiple sections of an image at the same time.

3. The apparatus of claim 1, wherein the projector is a digital projector.

4. The apparatus of claim 3, wherein the digital projector is a micro-mirror array projector.

5. The apparatus of claim 4, wherein the micro-mirror array projector is a digital light processing projector.

6. The apparatus of claim 3, wherein the digital projector is a liquid crystal display projector.

7. The apparatus of claim 3, wherein the digital projector is a liquid crystal on silicon projector.

8. The apparatus of claim 1, wherein the projector is an analog projector.

9. The apparatus of claim 1, wherein the light emitting material is fluorescent material.

10. The apparatus of claim 1, wherein each of the plurality of light emitting particles has a diameter less than about 300 nanometers.

11. The apparatus of claim 10, wherein each of the plurality of light emitting particles has a diameter less than about 200 nanometers.

12. The apparatus of claim 11, wherein each of the plurality of light emitting particles has a diameter less than about 100 nanometers.

13. The apparatus of claim 1, wherein each of the plurality of light emitting particles is an individual molecule.

14. The apparatus of claim 1, wherein the plurality of light emitting particles which emit red light comprise Europium.

15. The apparatus of claim 1, wherein the plurality of light emitting particles which emit green light comprise Terbium.

16. The apparatus of claim 1, wherein the plurality of light emitting particles which emit blue light or yellow light comprise Cerium.

17. The apparatus of claim 1, wherein the plurality of light emitting particles which emit blue light comprise Erbium.

18. The apparatus of claim 1, wherein the plurality of light emitting particles which emit blue light are comprised in an organic fluorescent dye.

19. The apparatus of claim 1, wherein the light emitting material comprises:

a first material which emits a first visible color; and a second material which emits a second visible color, which is different from the first visible color.

20. The apparatus of claim 19, wherein:
the first material is integrated into a first region of the substantially transparent substrate; and
the second material is integrated into a second region of the substantially transparent substrate.

21. The apparatus of claim 20, wherein the first region and the second region are pixels.

22. The apparatus of claim 21, wherein the pixels are formed in stripes.

23. The apparatus of claim 21, wherein the pixels are formed in a matrix.

24. The apparatus of claim 20, wherein:
the first visible color is emitted according to selective projection of ultraviolet light on the first region by the projector, and
the second visible color is emitted according to selective projection of ultraviolet light on the second region by the projector.

25. The apparatus of claim 19, wherein the light emitting material comprises a third material which emits a third visible color, which is different from the first visible color and the second visible color.

26. The apparatus of claim 25, wherein the first visible color, the second visible color, and the third visible color are primary colors.

27. The apparatus of claim 24, wherein a fourth color is emitted by a combination of substantially simultaneous selective projection of ultraviolet light on the first region and the second region.

28. The apparatus of claim 27, wherein the fourth color is a non-primary color.

29. An apparatus comprising light emitting material integrated into a substantially transparent substrate, wherein:
the light emitting material is configured to emit visible light in response to absorption of ultraviolet light;
the light emitting material comprises a plurality of light emitting particles; and
each of the plurality of light emitting particles has a diameter less than about 400 nanometers.

30. The apparatus of claim 29, wherein each of the plurality of light emitting particles has a diameter less than about 300 nanometers.

31. The apparatus of claim 30, wherein each of the plurality of light emitting particles has a diameter less than about 200 nanometers.

32. The apparatus of claim 31, wherein each of the plurality of light emitting particles has a diameter less than about 100 nanometers.

33. The apparatus of claim 29, wherein each of the plurality of light emitting particles is an individual molecule.

34. The apparatus of claim 29, wherein the plurality of light emitting particles are fluorescent material.

35. The apparatus of claim 29, wherein the plurality of light emitting particles which emit red light comprise Europium.

36. The apparatus of claim 29, wherein the plurality of light emitting particles which emit green light comprise Terbium.

37. The apparatus of claim 29, wherein the plurality of light emitting particles which emit blue light or yellow light comprise Cerium.

38. The apparatus of claim 29, wherein the plurality of light emitting particles which emit blue light comprise Erbium.

39. The apparatus of claim 29, wherein the plurality of light emitting particles which emit blue light are comprised in an organic fluorescent dye.

40. The apparatus of claim 29, wherein the light emitting material comprises:
a first material which emits a first visible color; and
a second material which emits a second visible color, which is different from the first visible color.

41. The apparatus of claim 40, wherein:
the first material is integrated into a first region of the substantially transparent substrate; and
the second material is integrated into a second region of the substantially transparent substrate.

42. The apparatus of claim 41, wherein the first region and the second region are pixels.

43. The apparatus of claim 42, wherein the pixels are formed in stripes.

44. The apparatus of claim 42, wherein the pixels are formed in a matrix.

45. The apparatus of claim 42, wherein the pixels are configured to emit visible light in response to absorption of ultraviolet light from a beam of ultraviolet light.

46. The apparatus of claim 45, wherein the beam of ultraviolet light is from a laser apparatus which emits ultraviolet light.

47. The apparatus of claim 45, wherein the pixels are configured to selectively emit visible light in response to spatial modulation of the beam of ultraviolet light.

48. The apparatus of claim 45, wherein the pixels are configured to selectively emit visible light in response to intensity modulation of the beam of ultraviolet light.

49. The apparatus of claim 41, wherein:
the first visible color is emitted according to selective projection of ultraviolet light on the first region; and
the second visible color is emitted according to selective projection of ultraviolet light on the second region.

50. The apparatus of claim 40, wherein the light emitting material comprises a third material which emits a third visible color, which is different from the first visible color and the second visible color.

51. The apparatus of claim 50, wherein the first visible color, the second visible color, and the third visible color are primary colors.

52. The apparatus of claim 40, wherein a fourth color is emitted by a combination of substantially simultaneous selective projection of ultraviolet light on the first region and the second region.

53. The apparatus of claim 52, wherein the fourth color is a non-primary color.

54. The apparatus of claim 29, wherein the light emitting material is homogeneously integrated into the substantially transparent substrate.

55. The apparatus of claim 54, wherein the ultraviolet light is intensity modulated to emit substantially monochromatic light from the substantially transparent substrate at different intensities.

56. The apparatus of claim 55, wherein the ultraviolet light is output from a broad-band UV projector.

57. The apparatus of claim 29, wherein the ultraviolet light originates from a projector.

58. The apparatus of claim 57, wherein the projector is configured to output multiple sections of an image at the same time.

59. The apparatus of claim 57, wherein the projector is a digital projector.

60. The apparatus of claim 59, wherein the digital projector is a micro-mirror array projector.

61. The apparatus of claim 60, wherein the micro-mirror array projector is a digital light processing projector.

62. The apparatus of claim 59, wherein the digital projector is a liquid crystal display projector.

63. The apparatus of claim 59, wherein the digital projector is a liquid crystal on silicon projector.

64. The apparatus of claim 57, wherein the projector is an analog projector.

* * * * *